(12) United States Patent
Eto et al.

(10) Patent No.: US 10,746,236 B2
(45) Date of Patent: Aug. 18, 2020

(54) CLUTCH CONTROL DEVICE

(71) Applicant: Nidec Tosok Corporation, Zama-shi, Kanagawa (JP)

(72) Inventors: Takamitsu Eto, Zama (JP); Fumiya Sagara, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 194 days.

(21) Appl. No.: 15/768,189

(22) PCT Filed: Oct. 14, 2016

(86) PCT No.: PCT/JP2016/080457
§ 371 (c)(1),
(2) Date: Apr. 13, 2018

(87) PCT Pub. No.: WO2017/065248
PCT Pub. Date: Apr. 20, 2017

(65) Prior Publication Data
US 2018/0306251 A1 Oct. 25, 2018

(30) Foreign Application Priority Data

Oct. 15, 2015 (JP) .................................. 2015-203638

(51) Int. Cl.
*F16D 48/02* (2006.01)
*F16D 48/06* (2006.01)

(52) U.S. Cl.
CPC ............. *F16D 48/02* (2013.01); *F16D 25/14* (2013.01); *F16D 48/066* (2013.01);
(Continued)

(58) Field of Classification Search
CPC ................... F16D 48/02; F16D 48/066; F16D 2048/0233; F16D 2048/0245;
(Continued)

(56) References Cited

U.S. PATENT DOCUMENTS

2004/0159523 A1 8/2004 Duan et al.
2010/0155192 A1 6/2010 Kohlbock
(Continued)

FOREIGN PATENT DOCUMENTS

DE 10 2009 056 673 A1 7/2010
DE 11 2012 001 692 T5 1/2014
(Continued)

*Primary Examiner* — David R Morris
*Assistant Examiner* — Lori Wu
(74) *Attorney, Agent, or Firm* — Keating & Bennett

(57) ABSTRACT

There is provided a clutch control device which includes an electric oil pump, a clutch unit, and a pressure measurement unit, and which controls an operation of the electric oil pump so as to change a transmission state of the clutch unit. The device includes a pressure control valve that is located between an oil passage for connecting the electric oil pump and the clutch unit to each other and an oil pan for storing an unpressurized hydraulic oil, and that discharges the pressurized hydraulic oil from the oil passage to the oil pan, when pressure of the hydraulic oil exceeds valve opening pressure, and a pump drive control unit that controls hydraulic pressure by driving the electric oil pump, based on target pressure indicated by a change command of the transmission state of the clutch unit and the hydraulic pressure measured by the pressure measurement unit.

8 Claims, 3 Drawing Sheets

(52) U.S. Cl.
CPC ............... *F16D 2048/0221* (2013.01); *F16D 2048/0233* (2013.01); *F16D 2048/0245* (2013.01); *F16D 2300/18* (2013.01); *F16D 2500/1024* (2013.01); *F16D 2500/1026* (2013.01); *F16D 2500/3024* (2013.01); *F16D 2500/3042* (2013.01); *F16D 2500/3067* (2013.01); *F16D 2500/50293* (2013.01); *F16D 2500/70406* (2013.01); *F16D 2500/70448* (2013.01)

(58) Field of Classification Search
CPC ..... F16D 2048/0221; F16D 2500/1024; F16D 2500/1026; F16D 2500/3024; F16D 2500/3042; F16D 2500/3067; F16D 2500/50293; F16D 2500/70406; F16D 2500/70448; F16D 25/14
See application file for complete search history.

(56) References Cited

U.S. PATENT DOCUMENTS

| | | | |
|---|---|---|---|
| 2014/0020374 A1 | 1/2014 | Sugo et al. | |
| 2016/0069402 A1* | 3/2016 | Chimner | F16D 48/066 701/67 |

FOREIGN PATENT DOCUMENTS

| | | |
|---|---|---|
| JP | 58-053947 U | 4/1983 |
| JP | 58-082533 U | 6/1983 |
| WO | 2012/141128 A1 | 10/2012 |

* cited by examiner

CLUTCH CONTROL DEVICE

BACKGROUND OF THE INVENTION

1. Field of the Invention

The present invention relates to a clutch control device.

2. Description of the Related Art

For example, an in-vehicle clutch control device has been proposed which controls a clutch engagement state by causing an electric oil pump to change hydraulic pressure of a piston chamber of a clutch. For example, Pamphlet of International Publication No. 2012/141128 is known.

According to the clutch control device in the related art as described above, if vibration generated in a vehicle during clutch engagement needs to be suppressed, a time required for changing a clutch engagement state is prolonged in some cases. In addition, according to the clutch control device in the related art as described above, if the time required for changing the clutch engagement state needs to be shortened, the vibration generated in the vehicle during the clutch engagement cannot be suppressed in some cases. That is, according to the clutch control device in the related art as described above, there is a problem in that suppressing the vibration generated in the vehicle and shortening the time required for changing the clutch engagement state cannot be compatibly achieved.

SUMMARY OF THE INVENTION

The present invention is made in view of the above-described circumstances, and an object thereof is to provide a clutch control device which can compatibly achieve suppressing vibration generated in a vehicle and shortening a time required for changing a clutch engagement state.

According to an aspect of the present invention, there is provided a clutch control device which includes an electric oil pump for supplying pressurized hydraulic oil, a clutch unit for changing a force transmission state into any one of a non-transmission state, a semi-transmission state, and a total-transmission state in accordance with pressure of the hydraulic oil to be supplied from the electric oil pump, and a pressure measurement unit for measuring hydraulic pressure of the hydraulic oil to be supplied to the clutch unit, and which controls an operation of the electric oil pump so as to change a transmission state of the clutch unit. The device includes a pressure control valve that is located between an oil passage for connecting the electric oil pump and the clutch unit to each other and an oil pan for storing an unpressurized hydraulic oil, and that discharges the pressurized hydraulic oil from the oil passage to the oil pan, in a case where pressure of the hydraulic oil exceeds valve opening pressure, and a pump drive control unit that controls the hydraulic pressure by driving the electric oil pump, based on target pressure indicated by a change command of the transmission state of the clutch unit and the hydraulic pressure measured by the pressure measurement unit.

According to the aspect of the present invention, there is provided a clutch control device which can compatibly achieve suppressing vibration generated in a vehicle and shortening a time required for changing a clutch engagement state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a clutch control device according to an embodiment of the present invention will be described with reference to the drawings. A scope of the present invention is not limited to the following embodiment, and can be optionally modified within a technical idea of the present invention.

Figure 1:
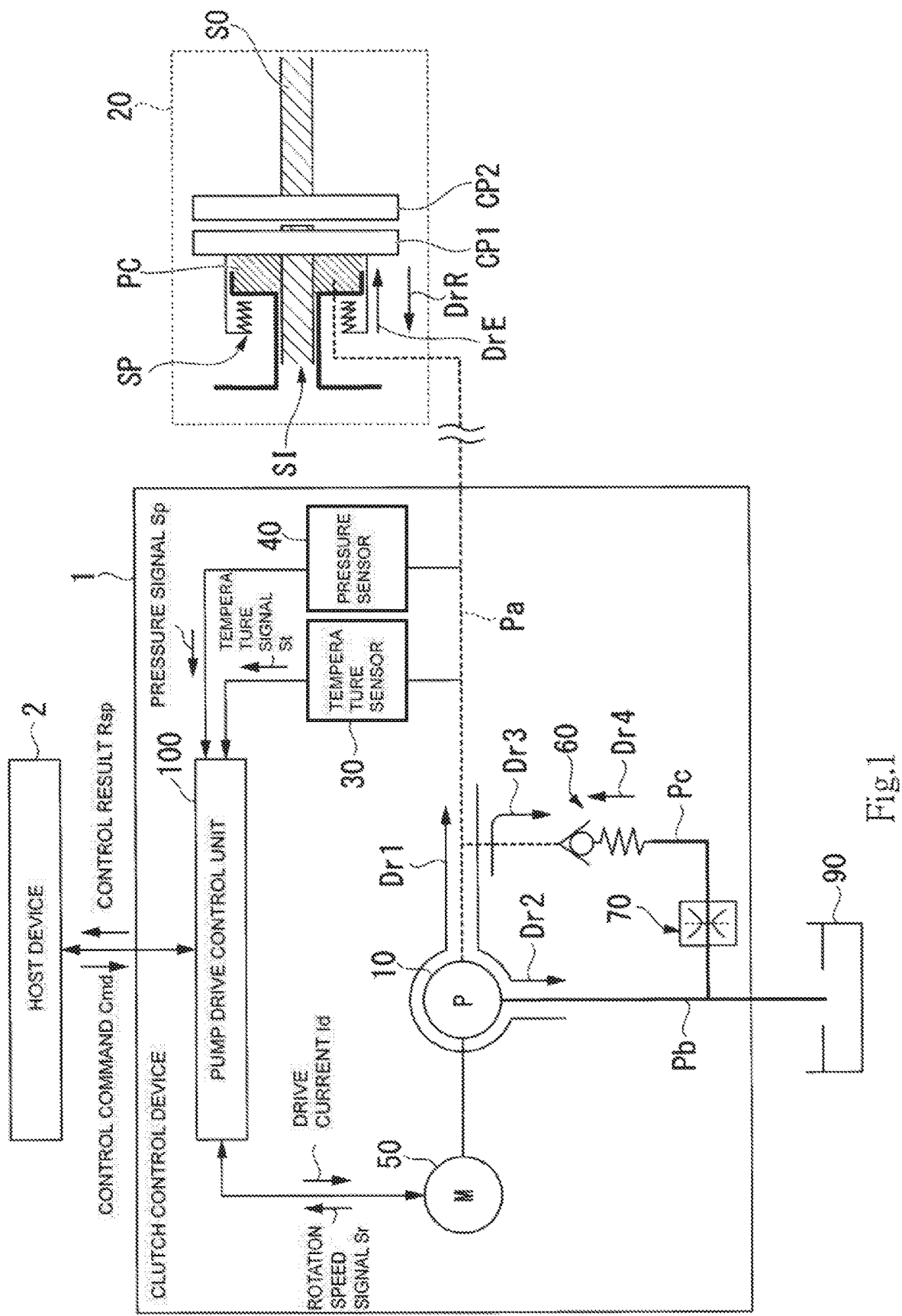
FIG. 1 is a block diagram illustrating an example of a configuration of a clutch control device according to an embodiment.

Referring to FIG. 1, a clutch control device 1 according to the present embodiment will be described. FIG. 1 is a block diagram illustrating an example of a configuration of the clutch control device 1 according to the embodiment. The clutch control device 1 supplies hydraulic pressure to a clutch unit 20 of a vehicle, based on a control command Cmd issued by a host device 2.

The clutch unit 20 includes an input shaft SI, an input-side clutch plate CP1, an output shaft SO, an output-side clutch plate CP2, a piston chamber PC, and a release spring SP. A rotational force output from a motor (not illustrated) is transmitted to the input shaft SI. Hydraulic oil is supplied to the piston chamber PC.

The input-side clutch plate CP1 is coupled with the input shaft SI, and is rotated along with the input shaft SI. The input-side clutch plate CP1 moves in an engagement direction DrE and a disengagement direction DrR in accordance with the amount of the hydraulic oil to be supplied to the piston chamber PC. Specifically, the input-side clutch plate CP1 moves in the engagement direction DrE, if the amount of the hydraulic oil to be supplied to the piston chamber PC increases. The release spring SP applies a force to the input-side clutch plate CP1 so as to move in the disengagement direction DrR. The input-side clutch plate CP1 moves in the disengagement direction DrR, if the amount of the hydraulic oil to be supplied to the piston chamber PC decreases.

The output shaft SO is rotated around a rotation axis coaxial with a rotation axis of the input shaft SI. The output-side clutch plate CP2 is coupled with the output shaft SO, and is rotated along with the output shaft SO. The output-side clutch plate CP2 is brought into contact with the input-side clutch plate CP1 by being pressed in accordance with a movement amount of the input-side clutch plate CP1.

As described above, the input-side clutch plate CP1 is pressed in the disengagement direction DrR by the release spring SP. Therefore, in a state where the amount of the hydraulic oil is small in the piston chamber PC, the input-side clutch plate CP1 and the output-side clutch plate CP2 do not come into contact with each other. Accordingly, in the state where the amount of the hydraulic oil is small in the piston chamber PC, the rotational force is not transmitted from the input shaft SI to the output shaft SO. In the following description, a state where the input-side clutch plate CP1 and the output-side clutch plate CP2 are not in contact with each other will be referred to as a non-transmission state.

If the amount of the hydraulic oil gradually increases in the piston chamber PC from the amount of the hydraulic oil in a case of a non-contact state, the input-side clutch plate CP1 and the output-side clutch plate CP2 start to come into contact with each other. If the input-side clutch plate CP1 and the output-side clutch plate CP2 are in contact each other, the rotational force is transmitted from the input shaft SI to the output shaft SO. In a case where the input-side clutch plate CP1 is weakly pressed against the output-side clutch plate CP2, slippage occurs between the input-side clutch plate CP1 and the output-side clutch plate CP2. In the following description, a state where the input-side clutch plate CP1 is in contact with the output-side clutch plate CP2 and the slippage occurs between the input-side clutch plate CP1 and the output-side clutch plate CP2 will be referred to as a half engaged clutch state or a semi-transmission state.

In a case where the amount of the hydraulic oil further increases in the piston chamber PC, the input-side clutch plate CP1 is sufficiently strongly pressed against the output-side clutch plate CP2. In a where contact pressure is sufficiently high between the input-side clutch plate CP1 and the output-side clutch plate CP2, the slippage does not occur between the input-side clutch plate CP1 and the output-side clutch plate CP2. In the following description, a state where the input-side clutch plate CP1 and the output-side clutch plate CP2 are in contact each other without any slippage will be referred to as a total-transmission state.

When a vehicle starts to move, the clutch control device 1 changes the clutch unit 20 from a non-transmission state to the total-transmission state via a semi-transmission state. Here, it is desirable that a time required for changing the clutch unit 20 from the non-transmission state to the semi-transmission state is shorter. On the other hand, when the clutch unit 20 is changed from the non-transmission state to the semi-transmission state in order to reduce vibration generated in the vehicle during clutch engagement, accurate control needs to be performed on a position of the input-side clutch plate CP1. Hereinafter, a configuration of the clutch control device 1 will be described which can compatibly achieve shortening the time required for changing the clutch unit 20 from the non-transmission state to the semi-transmission state and accurately controlling the position of the input-side clutch plate CP1.

The clutch control device 1 includes an oil pump 10, a pressure sensor 40, an electric motor 50, a pressure control valve 60, an orifice 70, and a pump drive control unit 100.

The pressure sensor 40 measures the hydraulic pressure of the hydraulic oil inside a first oil passage Pa. Here, the first oil passage Pa is a hydraulic oil pipe which connects the oil pump 10 and the piston chamber PC to each other.

The oil pump 10 pressurizes the hydraulic oil, and supplies the pressurized hydraulic oil to the piston chamber PC of the clutch unit 20. Specifically, for example, the oil pump 10 includes an inner rotor and an outer rotor which are formed in a trochoidal shape (both are not illustrated). The oil pump 10 supplies the hydraulic oil stored in an oil pan 90 to the piston chamber PC by way of a second oil passage Pb and the first oil passage Pa by rotating the inner rotor. That is, the oil pump 10 causes the hydraulic oil stored in the oil pan 90 to move in a direction Dr1 illustrated in FIG. 1. Here, the second oil passage Pb is a hydraulic oil pipe which connects the oil pan 90 and the oil pump 10 to each other.

When a pressurizing operation performed by the oil pump stops, the hydraulic oil inside the piston chamber PC is discharged to the first oil passage Pa by the release spring SP of the clutch unit 20. The hydraulic oil discharged to the first oil passage Pa moves from a gap between the inner rotor and the outer rotor of the oil pump 10 to the second oil passage Pb, and is discharged to the oil pan 90. That is, the release spring SP causes the hydraulic oil inside the piston chamber PC to move in the direction Dr2 illustrated in FIG. 1.

The electric motor 50 drives the oil pump 10 under the control of the pump drive control unit 100. That is, the oil pump 10 is an electric oil pump.

The pump drive control unit 100 is connected to the host device 2, and is operated based on a control command Cmd output by the host device 2. The control command Cmd includes a clutch engagement command to change the clutch unit 20 from a non-engagement state to a semi-engagement state or a total-engagement state, and a pump stop command to stop an operation of the electric motor 50. That is, the host device 2 outputs a command to change a transmission state of the clutch unit to the pump drive control unit 100. If the pump drive control unit 100 receives a clutch engagement command from the host device 2, the pump drive control unit 100 outputs a drive current Id to the electric motor 50 so as to drive the oil pump 10. In this manner, the hydraulic pressure of the hydraulic oil inside the first oil passage Pa is raised up to predetermined pressure. In the present embodiment, a case will be described where the pump drive control unit 100 changes the clutch unit 20 from the non-engagement state to the semi-engagement state when the pump drive control unit 100 receives the clutch engagement command. In this case, if the pump drive control unit 100 receives the clutch engagement command, the pump drive control unit 100 raises the hydraulic pressure of the hydraulic oil inside the first oil passage Pa up to semi-engagement target pressure P2 which is target pressure in the semi-engagement state. In addition, if the pump drive control unit 100 receives the pump stop command from the host device 2, the pump drive control unit 100 stops driving the electric motor 50.

The pressure control valve 60 is opened in a case where the hydraulic pressure of the first oil passage Pa exceeds the predetermined pressure. The predetermined pressure will be referred to as valve opening pressure P1. That is, the pressure control valve 60 is opened in a case where the hydraulic pressure of the first oil passage Pa exceeds the valve opening pressure P1, and discharges the hydraulic oil inside the first oil passage Pa to the oil pan 90 by way of a third oil passage Pc. Here, the third oil passage Pc is a hydraulic oil pipe between the pressure control valve 60 and the orifice 70 in the hydraulic oil pipe which connects the oil pan 90 and the pressure control valve 60 to each other. The pressure control valve 60 is a one-way valve, and prevents the hydraulic oil from moving in a direction Dr4 illustrated in FIG. 1. In addition, the pressure control valve 60 is closed in a case where the hydraulic pressure of the first oil passage Pa does not exceed the valve opening pressure P1, and does not allow the hydraulic oil inside the first oil passage Pa to pass through the third oil passage Pc. When the pressure control valve 60 is closed, the hydraulic oil inside the first oil passage Pa moves from a gap between the inner rotor and the outer rotor of the oil pump 10 to the second oil passage Pb, and is discharged to the oil pan 90.

The orifice 70 is provided between the pressure control valve 60 and the oil pan 90, and generates a pressure difference of the hydraulic oil in an oil discharge direction, compared to the hydraulic oil discharged from the first oil passage Pa to the oil pan 90 by way of the pressure control valve 60. That is, the orifice 70 generates the pressure difference between the hydraulic pressure of the hydraulic oil inside the third oil passage Pc and the hydraulic pressure of the hydraulic oil inside the second oil passage Pb. In a case where the hydraulic oil moves from the third oil passage Pc to the second oil passage Pb after the pressure control valve 60 is opened, the orifice 70 maintains the hydraulic pressure of the hydraulic oil inside the third oil passage Pc so as to be higher than the hydraulic pressure of the hydraulic oil inside the second oil passage Pb. That is, since the clutch control device 1 includes the orifice 70, the clutch control device 1 can suppress a rapid decrease in the hydraulic pressure of the hydraulic oil inside the first oil passage Pa in a case where the pressure control valve 60 is opened. In other words, since the clutch control device 1 includes the orifice 70, the clutch control device 1 can improve ability to control the hydraulic pressure of the hydraulic oil inside the first oil passage Pa.

In the present embodiment, as an example of a differential pressure unit which generates the pressure difference between the hydraulic pressure of the hydraulic oil inside the third oil passage Pc and the hydraulic pressure of the hydraulic oil inside the second oil passage Pb, a case has been described where the clutch control device 1 includes the orifice 70. However, the present invention is not limited thereto. The clutch control device 1 may adopt any configuration as long as the clutch control device 1 can cause a pressure loss to the hydraulic oil discharged from the first oil passage Pa to the oil pan 90 by way of the pressure control valve 60. Alternatively, the clutch control device 1 may include the other differential pressure unit instead of the orifice 70.

Figure 2:
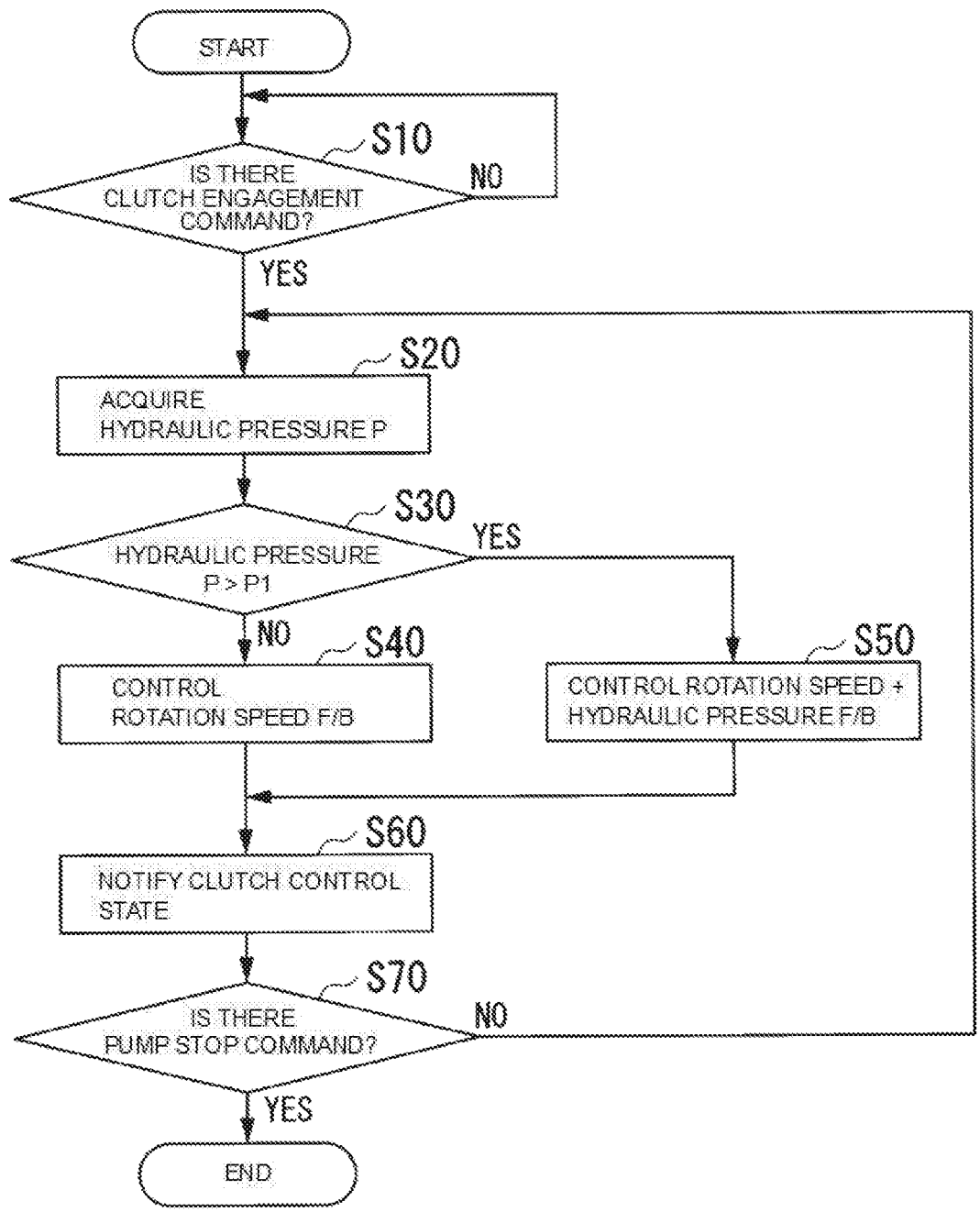
FIG. 2 is a flowchart illustrating an example of a pressure control operation performed by a pump drive control unit according to the present embodiment.

Next, an example of pressure control using the pump drive control unit 100 will be described with reference to FIGS. 2 and 3. FIG. 2 is a flowchart illustrating an example of a pressure control operation performed by the pump drive control unit 100 according to the present embodiment.

The pump drive control unit 100 determines the presence or absence of a clutch engagement command (Step S10). In a case where the pump drive control unit 100 determines that the clutch engagement command is not received from the host device 2 (Step S10; NO), the process in Step S10 is repeatedly performed. In a case where the pump drive control unit 100 determines that the clutch engagement command is received from the host device 2 (Step S10; YES), the process proceeds to Step S20.

The pump drive control unit 100 acquires hydraulic pressure FP of the hydraulic oil inside the first oil passage Pa which is measured by the pressure sensor 40 (Step S20), and compares the acquired hydraulic pressure FP and the valve opening pressure P1 with each other (Step S30). In a case where the pump drive control unit 100 determines that the hydraulic pressure FP of the hydraulic oil inside the first oil passage Pa is higher than the valve opening pressure P1 (Step S30; YES), the process proceeds to Step S50. In addition, in a case where the pump drive control unit 100 determines that the hydraulic pressure FP of the hydraulic oil inside the first oil passage Pa is equal to or lower than the valve opening pressure P1 (Step S30; NO), the process proceeds to Step S40. That is, the pump drive control unit 100 switches the processes, depending on whether or not the hydraulic pressure FP measured by the pressure measurement unit exceeds the valve opening pressure P1.

In Step S40, the pump drive control unit 100 drives the electric motor 50 by using a first drive method. In a case of the first drive method, the pump drive control unit 100 drives the oil pump 10 regardless of the hydraulic pressure measured by the pressure sensor 40. An example of the first drive method includes a drive method of using rotation speed feedback control of the electric motor 50. In addition, in Step S50, the pump drive control unit 100 drives the electric motor 50 by using a second drive method. In a case of the second drive method, the pump drive control unit 100 drives the oil pump 10, based on the hydraulic pressure measured by the pressure sensor 40. An example of the second drive method includes a drive method of using the rotation speed feedback control of the electric motor 50 and hydraulic pressure feedback control of the hydraulic oil inside the first oil passage Pa.

Here, the rotation speed feedback control of the electric motor 50 means control in which target rotation speed of the electric motor 50 and actual rotation speed of the electric motor 50 are compared with each other so that the actual rotation speed of the electric motor 50 is asymptotic to the target rotation speed of the electric motor 50. In the rotation speed feedback control, the pump drive control unit 100 compares a rotation speed signal Sr output from the electric motor 50 and the target rotation speed with each other, thereby controlling a drive current Id to be supplied to the electric motor 50. The hydraulic pressure feedback control of the hydraulic oil inside the first oil passage Pa means control in which the target hydraulic pressure of the hydraulic oil inside the first oil passage Pa and the hydraulic pressure FP of the hydraulic oil inside the first oil passage Pa which is measured by the pressure sensor 40, that is, the actual hydraulic pressure, are compared with each other so that the actual hydraulic pressure is asymptotic to the target hydraulic pressure. In the hydraulic pressure feedback control, the pump drive control unit 100 compares a pressure signal Sp output by the pressure sensor 40 with the target hydraulic pressure, thereby controlling the drive current Id to be supplied to the electric motor 50.

Subsequently, the pump drive control unit 100 notifies the host device 2 of a control state of the clutch unit 20 (Step S60). The control state of the clutch unit 20 which is notified to the host device 2 by the pump drive control unit 100 includes information indicating whether or not the clutch unit 20 is in the semi-engagement state. More specifically, in a case where the hydraulic pressure FP of the hydraulic oil inside the first oil passage Pa reaches the semi-engagement target pressure P2, the pump drive control unit 100 notifies the host device 2 that the clutch unit 20 is in semi-engagement state. If the host device 2 is notified by the pump drive control unit 100 that the clutch unit 20 is in the semi-engagement state, the host device 2 outputs a pump stop command to the pump drive control unit 100.

The pump drive control unit 100 determines the presence or absence of the pump stop command (Step S70). If the pump drive control unit 100 determines that the pump stop command is not received (Step S70; NO), the pump drive control unit 100 continues to perform the process after returning to the process in Step S20. In a case where the pump drive control unit 100 determines that the pump stop command is received (Step S70; YES), the pump drive control unit 100 ends the process.

Here, referring to FIG. 3, an example of a control result obtained by the pump drive control unit 100 will be described. FIG. 3 is a graph illustrating an example of a pressure control waveform obtained by the pump drive control unit 100 according to the present embodiment. At time t0 illustrated in FIG. 3, the pump drive control unit 100 receives the clutch engagement command from the host device 2. If the pump drive control unit 100 receives the clutch engagement command, the pump drive control unit 100 supplies the electric motor 50 with the drive current Id so as to drive the oil pump 10. In this manner, the hydraulic pressure FP of the hydraulic oil is raised inside the first oil passage Pa.

Figure 3:
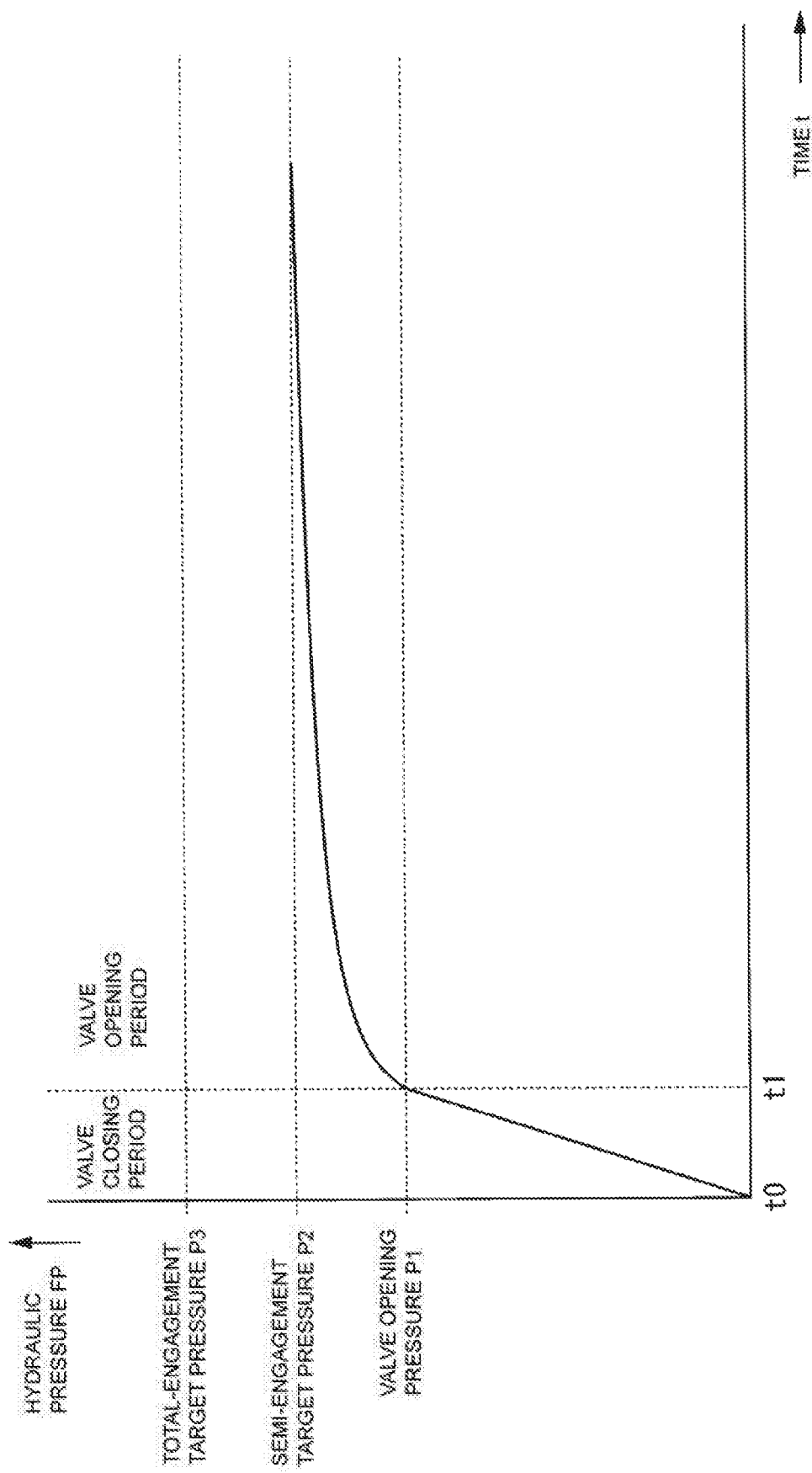
FIG. 3 is a graph illustrating an example of a pressure control waveform obtained by the pump drive control unit according to the present embodiment.

As described above, in a case where the hydraulic pressure FP is equal to or lower than the valve opening pressure P1 of the pressure control valve 60, that is, during time t0 to time t1 illustrated in FIG. 3, the pump drive control unit 100 performs the rotation speed feedback control. That is, in a case where the hydraulic pressure FP is equal to or lower than the valve opening pressure P1 of the pressure control valve 60, the pump drive control unit 100 performs the rotation speed feedback control, but does not perform the hydraulic pressure feedback control.

In general, according to the hydraulic pressure feedback control, as control target hydraulic pressure is asymptotic to the target hydraulic pressure, the hydraulic pressure is gently changed. If the change speed of the hydraulic pressure is gentle, a time required until the control target hydraulic pressure reaches the target hydraulic pressure is prolonged. That is, if the hydraulic pressure feedback control is performed, the time required until the control target hydraulic pressure reaches the target hydraulic pressure is prolonged. Accordingly, a time required for changing the clutch engagement state is less likely to be shortened in some cases.

According to the pump drive control unit 100 of the present embodiment, in a case where the hydraulic pressure FP is equal to or lower than the valve opening pressure P1 of the pressure control valve 60, the pump drive control unit 100 does not perform the hydraulic pressure feedback control. Accordingly, the control target hydraulic pressure FP can be quickly raised. That is, the pump drive control unit 100 can shorten the time required until the control target hydraulic pressure FP reaches the semi-engagement target pressure P2, compared to a case where the hydraulic pressure feedback control is performed.

On the other hand, in a case where the hydraulic pressure feedback control is performed, accuracy in controlling the hydraulic pressure can be improved, compared to a case where the hydraulic pressure feedback control is not performed. The pump drive control unit 100 performs the hydraulic pressure feedback control in addition to the rotation speed feedback control, in a case where the hydraulic pressure FP exceeds the valve opening pressure P1 of the pressure control valve 60. That is, the pump drive control unit 100 can improve the accuracy in controlling the hydraulic pressure, in a case where the hydraulic pressure FP exceeds the valve opening pressure P1 of the pressure control valve 60.

Here, description will be made with regard to a period until the clutch unit 20 is changed from the non-engagement state to the semi-engagement state. The pump drive control unit 100 causes a control switching threshold value to coincide with the valve opening pressure P1 of the pressure control valve 60. The valve opening pressure P1 is set to a value lower than the semi-engagement target pressure P2. That is, the control switching threshold value set by the pump drive control unit 100 is lower than the semi-engagement target pressure P2 which is the target pressure indicated by the host device 2. The control switching threshold value, that is, the valve opening pressure P1 is set to a value lower than the hydraulic pressure at which the input-side clutch plate CP1 and the output-side clutch plate CP2 start to come into contact with each other. Therefore, the pump drive control unit 100 does not perform the hydraulic pressure feedback control until the hydraulic pressure FP reaches the valve opening pressure P1. In this manner, the pump drive control unit 100 quickly raises the hydraulic pressure FP. Therefore, the pump drive control unit 100 can shorten the time required for changing the clutch engagement state. In addition, during a period until the input-side clutch plate CP1 of the clutch unit 20 moves in the engagement direction DrE and comes into contact with the output-side clutch plate CP2, even though the accuracy in controlling the hydraulic pressure is relatively low, the vibration in the vehicle is less likely to be generated. That is, since the input-side clutch plate CP1 and the output-side clutch plate CP2 are not in contact with each other until the hydraulic pressure FP reaches the valve opening pressure P1. Accordingly, the vibration in the vehicle is less likely to be generated. Therefore, during a period until the hydraulic pressure FP reaches the valve opening pressure P1, the pump drive control unit 100 can shorten the time required for changing the clutch engagement state while suppressing the occurrence of vibration in the vehicle.

In addition, in a case where the hydraulic pressure FP of the hydraulic oil inside the first oil passage Pa is lower than the valve opening pressure P1, the pressure control valve 60 is closed. Therefore, the hydraulic oil inside the first oil passage Pa is not discharged to the oil pan 90 side by way of the pressure control valve 60. Accordingly, in a case where the pressure control valve 60 is closed, supply pressure of the oil pump 10 is maintained without any change as the hydraulic pressure FP of the hydraulic oil inside the first oil passage Pa. That is, in a case where the pressure control valve 60 is closed, speed for raising the hydraulic pressure FP is improved, compared to a case where the pressure control valve 60 is opened. Therefore, as illustrated in a period between time t0 and time t1 in FIG. 3, the hydraulic pressure FP is rapidly raised. Accordingly, the time required for changing the clutch engagement state is shortened.

In addition, in a case where the hydraulic pressure FP is asymptotic to the semi-engagement target pressure P2 beyond the valve opening pressure P1, subtle hydraulic pressure control is required. Accordingly, it is desirable that the accuracy in controlling the hydraulic pressure is high. The pressure control valve 60 is opened in a case where the hydraulic pressure FP of the hydraulic oil inside the first oil passage Pa exceeds the valve opening pressure P1. In a case where the pressure control valve 60 is opened, the hydraulic pressure FP of the hydraulic oil inside the first oil passage Pa is lower than the supply pressure of the oil pump 10. That is, in a case where the hydraulic pressure FP is maintained to have a predetermined value in a state where the pressure control valve 60 is opened, the rotation speed of the oil pump 10 increases, compared to a case where the pressure control valve 60 is closed. Here, in the oil pump 10, the hydraulic pressure relatively less pulsates during the high speed rotation rather than during the low speed rotation. Accordingly, the accuracy in controlling the hydraulic pressure is high in some cases. In this case, in a case where the hydraulic pressure FP is asymptotic to the semi-engagement target pressure P2, the pressure control valve 60 is opened so as to increase the rotation speed of the oil pump 10. Therefore, the accuracy in controlling the hydraulic pressure FP can be improved.

As described above, the clutch control device 1 according to the present embodiment includes the pressure control valve 60, and the valve opening pressure P1 is set to be lower than the semi-engagement target pressure P2. In a case where the pressure control valve 60 is closed, the pressure of the first oil passage Pa is changed at relatively high speed, due to the operation of the oil pump 10. Therefore, the clutch control device 1 can move the input-side clutch plate CP1 at high speed from a non-engagement position to a semi-engagement position. In addition, according to the clutch control device 1, during a period until the input-side clutch plate CP1 and the output-side clutch plate CP2 come into contact with each other so as to generate a predetermined pressing force, the pressure control valve 60 is opened, and the oil pump 10 is rotated at high speed. Therefore, the control accuracy can be improved.

In addition, the pump drive control unit 100 of the clutch control device 1 switches the lower pressure side to high speed control, and switches the high pressure side to accurate control by setting the valve opening pressure P1 of the pressure control valve 60 as a boundary. In this manner, the clutch control device 1 enables the input-side clutch plate CP1 to move from the non-engagement position to the semi-engagement position at high speed. According to the clutch control device 1, during a period until the input-side clutch plate CP1 and the output-side clutch plate CP2 come into contact with each other so as to generate the predetermined pressing force, the clutch control device 1 can accurately control the pressing force of the input-side clutch plate CP1.

The clutch control device 1 may include a temperature sensor 30. The temperature sensor 30 measures temperature of the hydraulic oil inside the first oil passage Pa. The pump drive control unit 100 estimates a volume change caused by the temperature of the hydraulic oil, based on the temperature of the hydraulic oil which is measured by the temperature sensor 30. Since the clutch control device 1 includes the temperature sensor 30, the clutch control device 1 can control the hydraulic pressure in view of the volume change caused by the temperature of the hydraulic oil. Therefore, the accuracy in controlling the hydraulic pressure can be further improved.

In the above-described embodiment and the modification example described according to the embodiment, configurations can be appropriately combined with each other within the scope in which the configurations are not contradictory to each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A clutch control device which includes an electric oil pump for supplying pressurized hydraulic oil, a clutch unit for changing a force transmission state into any one of a non-transmission state, a semi-transmission state, and a total-transmission state in accordance with pressure of the hydraulic oil to be supplied from the electric oil pump, and a pressure measurement unit for measuring hydraulic pressure of the hydraulic oil to be supplied to the clutch unit, and which controls an operation of the electric oil pump so as to change the transmission state of the clutch unit, the device comprising:
a pressure control valve that is located between an oil passage for connecting the electric oil pump and the clutch unit to each other and an oil pan for storing an unpressurized hydraulic oil, and that discharges the pressurized hydraulic oil from the oil passage to the oil pan, in a case where pressure of the hydraulic oil exceeds valve opening pressure; and
a pump drive control unit that controls the hydraulic pressure by driving the electric oil pump, based on target pressure indicated by a change command of the transmission state of the clutch unit and the hydraulic pressure measured by the pressure measurement unit; wherein
the valve opening pressure of the pressure control valve is lower than the target pressure indicated by the change command.

2. The clutch control device according to claim 1, further comprising:
a differential pressure unit that generates a pressure difference of the hydraulic oil in an oil discharge direction, with respect to the hydraulic oil discharged from the oil passage to the oil pan by way of the pressure control valve.

3. The clutch control device according to claim 2, wherein the differential pressure unit is provided between the pressure control valve and the oil pan.

4. The clutch control device according to claim 1, wherein when the pressure control valve is closed, the hydraulic oil is discharged from the oil passage to the oil pan by way of the electric oil pump.

5. A clutch control device which includes an electric oil pump for supplying pressurized hydraulic oil, a clutch unit for changing a force transmission state into any one of a non-transmission state, a semi-transmission state, and a total-transmission state in accordance with pressure of the hydraulic oil to be supplied from the electric oil pump, and a pressure measurement unit for measuring hydraulic pressure of the hydraulic oil to be supplied to the clutch unit, and which controls an operation of the electric oil pump so as to change the transmission state of the clutch unit, the device comprising:
a pressure control valve that is located between an oil passage for connecting the electric oil pump and the clutch unit to each other and an oil pan for storing an unpressurized hydraulic oil, and that discharges the pressurized hydraulic oil from the oil passage to the oil pan, in a case where pressure of the hydraulic oil exceeds valve opening pressure; and
a pump drive control unit that controls the hydraulic pressure by driving the electric oil pump, based on target pressure indicated by a change command of the transmission state of the clutch unit and the hydraulic pressure measured by the pressure measurement unit; wherein
the pump drive control unit includes a first drive mode of driving the electric oil pump regardless of the hydraulic pressure measured by the pressure measurement unit and a second drive mode of driving the electric oil pump, based on the hydraulic pressure measured by the pressure measurement unit, and
in a case where the hydraulic pressure measured by the pressure measurement unit exceeds the valve opening pressure, a current drive mode is switched from the first drive mode to the second drive mode.

6. The clutch control device according to claim 5, further comprising:
a differential pressure unit that generates a pressure difference of the hydraulic oil in an oil discharge direction, with respect to the hydraulic oil discharged from the oil passage to the oil pan by way of the pressure control valve.

7. The clutch control device according to claim 5, wherein the differential pressure unit is provided between the pressure control valve and the oil pan.

8. The clutch control device according to claim 5,
wherein when the pressure control valve is closed, the hydraulic oil is discharged from the oil passage to the oil pan by way of the electric oil pump.

* * * * *